(12) United States Patent
Kinpara et al.

(10) Patent No.: US 6,468,460 B2
(45) Date of Patent: Oct. 22, 2002

(54) METHOD FOR MANUFACTURING HEAT-CURABLE RESIN MOLDED PRODUCT

(75) Inventors: Shigeru Kinpara; Yoshiyuki Sato; Hisayoshi Osumi; Senji Suzuki, all of Hamamatsu (JP)

(73) Assignee: Yamaha Corporation (JP)

( * ) Notice: Subject to any disclaimer, the term of this patent is extended or adjusted under 35 U.S.C. 154(b) by 0 days.

(21) Appl. No.: 09/330,919

(22) Filed: Jun. 11, 1999

(65) Prior Publication Data

US 2001/0009308 A1 Jul. 26, 2001

(30) Foreign Application Priority Data

Jun. 26, 1998 (JP) .......................................... 10-181195

(51) Int. Cl.[7] ............................................. B29C 45/14
(52) U.S. Cl. ................. 264/271.1; 264/46.9; 264/279.1
(58) Field of Search .............................. 264/46.4, 46.9, 264/271.1, 279.1

(56) References Cited

U.S. PATENT DOCUMENTS

| | | | | |
|---|---|---|---|---|
| 3,790,421 A | * | 2/1974 | Habgood, Jr. ................ | 156/77 |
| 4,040,670 A | * | 8/1977 | Williams .................... | 264/255 |
| 4,824,723 A | * | 4/1989 | Campbell et al. ........... | 428/332 |
| 4,949,457 A | * | 8/1990 | Burout, III .................. | 30/85 |
| 4,984,800 A | * | 1/1991 | Hamada ...................... | 273/173 |
| 5,286,320 A | * | 2/1994 | McGrath et al. ............. | 264/53 |
| 5,460,762 A | * | 10/1995 | Andre ......................... | 264/46.9 |
| 5,474,721 A | * | 12/1995 | Stevens ....................... | 264/46.9 |
| 5,529,731 A | * | 6/1996 | Bendick et al. ............. | 264/46.9 |
| 5,753,165 A | | 5/1998 | Watanabe et al. | |

FOREIGN PATENT DOCUMENTS

| | | | | |
|---|---|---|---|---|
| DE | 25 08 555 | * | 9/1977 | ................. 264/46.9 |
| DE | 19634360 | | 3/1998 | |
| JP | 4-52116 | * | 2/1992 | ................. 264/46.9 |

* cited by examiner

Primary Examiner—Allan R. Kuhns
(74) Attorney, Agent, or Firm—Dickstein, Shapiro, Morin & Oshinsky, LLP

(57) ABSTRACT

When molding of a heat-curable resin such as unsaturated polyester resin and the like is conducted by means of the casting method, concavities in the molded product generated as a result of the curing shrinkage of this resin are prevented. A central core member comprising ABS resin or the like is disposed in advance within mold, a heat-curable resin liquid is injected thereinto, and heated, and at this time, an amount of expansion in the volume of central core member is caused which corresponds to the amount of volume shrinkage resulting from curing of the heat-curable resin, and the expansion of the central core member is synchronized with the curing shrinkage of the heat-curable resin.

4 Claims, 2 Drawing Sheets

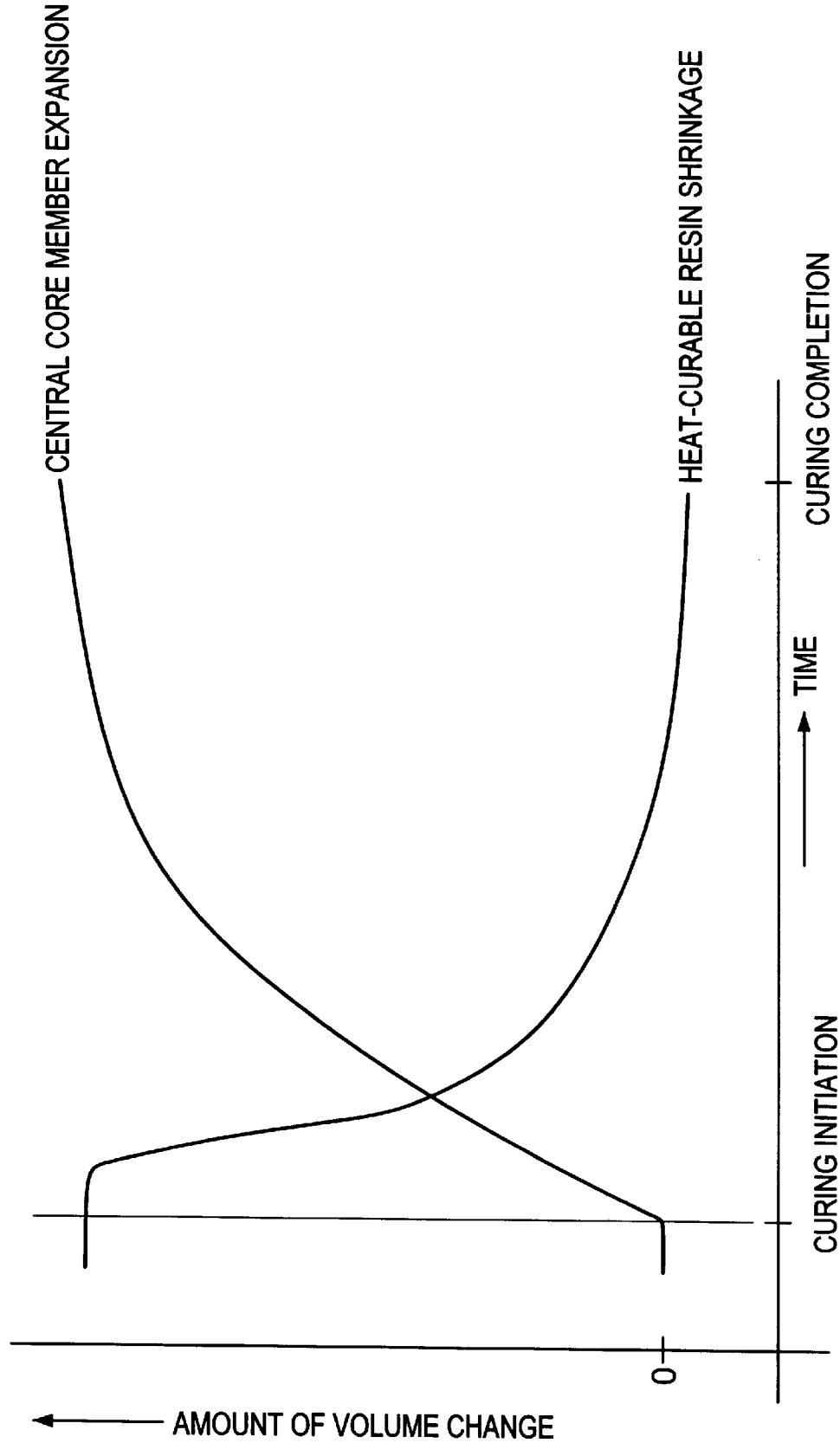

METHOD FOR MANUFACTURING HEAT-CURABLE RESIN MOLDED PRODUCT

BACKGROUND OF THE INVENTION

1. Field of the Invention

The present invention relates to a manufacturing method for molded products comprising a heat-curable resin (thermo-setting resin) such as unsaturated polyester resin, epoxy resin, urethane resin, diallylphthalate resin, or the like, which is capable of preventing the occurrence of voids or concavities (concave portions) on the surface of the molded products caused by the shrinkage in volume accompanying the curing of the heat-curable resin.

2. Description of the Related Art

This type of heat-curable resin experiences a comparatively large volume shrinkage during curing, so that for example, unsaturated polyester resin shrinks by as much as 7%. For this reason, when molded products are molded using a injection method, "concavities" are generated as a result of this volume shrinkage, and this produces concave defects in the surface of the molded products, so that unsatisfactory products result.

A method has been proposed as a solution to this problem in which the mold is placed under pressure during molding, and the volume of the molding space (cavity) of the mold is reduced in accordance with the decrease in volume resulting from curing. However, in this molding method, an apparatus for applying pressure is required, and furthermore, when the walls of the mold are curved, the pressure does not act uniformly over the entire surface of the mold, and it is impossible to completely prevent concavities.

Accordingly, it is an object of the present invention to avoid the generation of concavities (voids) in the surface of molded products when heat-curable resin is molded using the casting method.

SUMMARY OF THE INVENTION

The present invention provides a method in which a central core member is placed in advance within a mold, heat-curable resin liquid is injected around the central core member within the mold, and when the mold is heated and curing of the resin is conducted, and an increase in volume is generated in the central core member which is in correspondence with the reduction in volume of the heat-curable resin as a result of curing. The present invention also provides a manufacturing method for heat-curable resin molded products in which three necessary factors are controlled: the selection of the central core member, the adjustment of the curing rate of the heat-curable resin, and the setting of the temperature of the mold.

Accordingly, in accordance with the manufacturing method for heat-curable resin molded products of the present invention, even when a heat-curable resin having a large amount curing shrinkage, such as unsaturated polyester resin or the like, is employed, it is possible to produce molded products having a satisfactory finish without concavities in the surfaces thereof. Furthermore, in comparison with the conventional manufacturing method in which pressure was applied to the mold, it is possible to prevent the generation of concavities even when the shape of the molded product is complex, having curved surfaces or the like. It is not necessary to apply pressure to the mold, so that it is possible to simplify the manufacturing installation, and it is also possible to extend the lifespan of the mold.

BRIEF DESCRIPTION OF THE DRAWINGS

FIG. 3 is a graph showing the changes over time in the expansion of the central core member and the curing shrinkage of the heat-curable resin in the present invention.

DESCRIPTION OF THE PREFERRED EMBODIMENTS

Hereinbelow, the present invention will be explained in detail.

Figure 1:
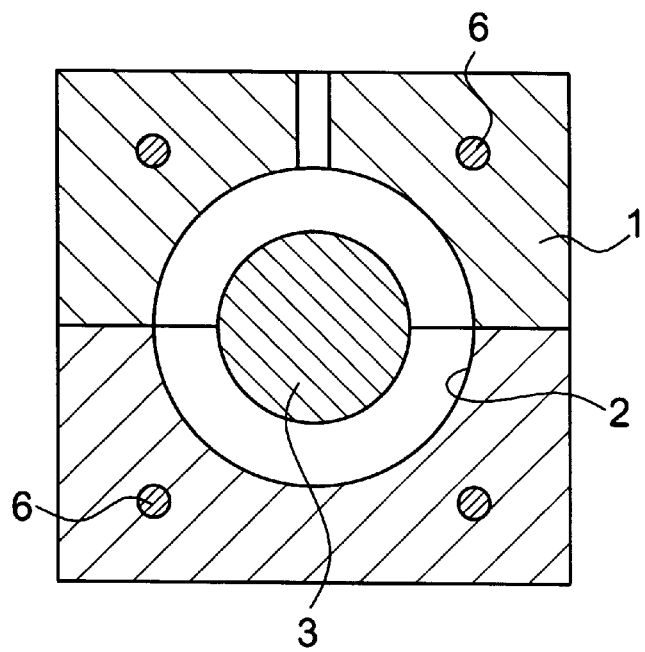
FIG. 1 is a schematic structural diagram showing an example of the manufacturing method of the present invention.
Figure 2:
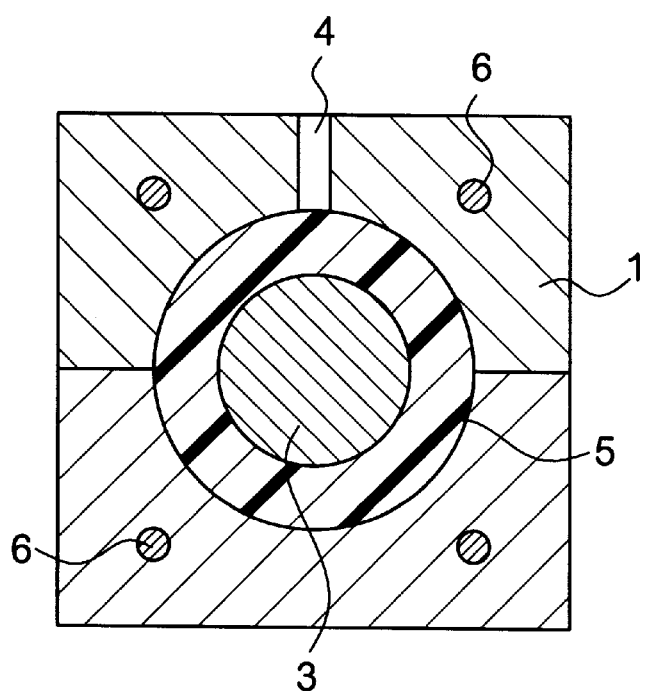
FIG. 2 is a schematic structural diagram showing an example of the manufacturing method of the present invention.

FIG. 1 and FIG. 2 serve to indicate an example of the manufacturing method of the present invention; they indicate an example in which a molded product which is cylindrical or doughnut-shaped is produced.

In the figures, reference 1 indicates a mold for molding, and this mold 1 has a structure which is divided into two parts, and in the inner part thereof, a cavity 2 forming the molding space is formed.

A central core member 3 which is cylindrical or doughnut-shaped is disposed within the cavity 2 of this mold 1. This central core member 3 becomes unitary with the heat-curable resin which is injected into the cavity 2 in a later process and forms a part of the molded product; concretely, the member comprises a resin material such as epoxy resin, foaming urethane resin, PPS resin (polyphenylene sulfide), polycarbonate resin, ABS resin, and the like, and the shape thereof is controlled by the shape of the molded product. Furthermore, it is preferable that the dimensions of the central core member 3 be determined so that it occupies 70–99% of the volume of the finished molded product.

The attachment of the central core member 3 within the cavity 2 is accomplished using a suspension pin or the like provided within mold 1.

Next, mold 1 is closed, and as shown in FIG. 2, a heat-curable resin liquid 5 in an uncured state is injected from gate 4, and this fills the interior of cavity 2.

Unsaturated polyester resin, urethane resin, epoxy resin, or diallylphthalate resin may be employed as the heat-curable resin used herein. These heat-curable resins are all employed mixed with a curing agent or a curing promoter, and it is important that the type or amount of curing agent or curing promoter or the like which is employed be appropriately altered in order to obtain the necessary curing rate and curing temperature described hereinbelow.

When the filling of heat-curable resin liquid 5 is completed, mold 1 is heated by the heaters 6, 6 . . . which are contained within mold 1, and by means of this, the heat-curable resin liquid 5 is heated and cured, and a molded product is obtained in which the central core member 3 and the heat-curable resin become unitary.

In this curing process, as described hereinbelow, it is important to control the mold temperature which governs the temperature of the central core member 3 and the heat-curable resin liquid 5 within the cavity 2, and especially to control a rate of increase in the temperature of the mold, and a temperature which the mold attains (hereinafter referred to as a final temperature).

Once the curing of the heat-curable resin has been completed, mold 1 is cooled, and the mold is opened to extract the molded product.

In the manufacturing method of the present invention, during the operations described above from the initiation of curing to the completion of curing, in response to the amount of shrinkage in the volume accompanying the curing of the heat-curable resin, an increase in volume is generated in the central core member 3 which is either equal to or slightly greater than the amount of shrinkage in the volume of the resin.

The amount of shrinkage in the volume of the heat-curable resin as a result of curing differs depending on the type of resin; however, this is not dependent on the curing temperature or rate of curing. Accordingly, if the volume of heat-curable resin liquid 5 which fills the interior of cavity 2 is fixed, then the shrinkage volume can be obtained by calculation.

On the other hand, the increase in volume of central core member 3 is determined by the material comprising the central core member 3 and the temperature thereof. Accordingly, in obtaining the amount of volume expansion required in central core member 3, it is possible to calculate this if the selection of the material and the final temperature within mold 1 are determined.

Generally, the mold 1 is categorized into two types, namely, an open type mold which does not close an injection aperture even when the curing process is conducted, and a closed type mold which closes the injection aperture during the curing. In the open type mold, the resin moves out of the aperture during curing when the volume expansion takes place in the central core member 3. In order to reliably prevent concavities in the molded product, it is insufficient to simply compensate for the shrinkage in the volume with an expansion of the volume of the central core member 3 at the point at which the heat-curable resin is completely cured.

In other words, as shown in FIG. 3, during the period from the initiation of curing of the heat-curable resin to the completion of curing thereof, an amount of volume increase in central core member 3 which corresponds to the increase in the amount of volume shrinkage, takes place approximately at the same time when the heat-curable resin is cured. In the closed type mold, the volume expansion in the center core member 3 which is equal to or slightly greater than the amount of shrinkage in the volume of the resin.

In order to meet the conditions described above, firstly, the selection of the material of central core member 3, secondly, the preparation composition, which stipulates the curing rate and curing temperature of the heat-curable resin liquid 5, and thirdly, the setting of the rate of increase of temperature of mold 1 and the final temperature, which stipulate the temperature of central core member 3 and the temperature of the heat-curable resin, are required.

By selecting an appropriate combination of these three, it is possible to completely prevent the concavities in the molded products.

These appropriate combinations are determined by preparatory molding experiments.

Furthermore, in general, a method is possible in which a central core member comprising a resin having a large coefficient of linear expansion, for example, ABS resin, polycarbonate resin, or the like, is combined with a heat-curable resin having a large amount of shrinkage during curing, for example, unsaturated polyester resin, and a method exists in which, when a central core member 3 comprising a resin having a small coefficient of linear expansion, for example, PPS resin, foaming polyurethane resin, or the like, is employed, a preparation composition having a slow rate of curing and a high curing temperature is employed as the heat-curable resin, the mold is slow, and the final temperature is set so as to be high.

Hereinbelow, concrete combinations of central core members 3, mixtures of heat-curable resins and mold temperatures (final temperatures) are shown together with the state of occurrence of concavities in the molded products.

| (1) Central Core Member | |
|---|---|
| Name of Material | Linear Expansion Coefficient |
| Epoxy resin | $4 \times 10^{-5}$ |
| Foaming urethane resin | $3 \times 10^{-5}$ |
| PPS resin | $2 \times 10^{-5}$ |
| Polycarbonate resin | $7 \times 10^{-5}$ |
| ABS resin | $8 \times 10^{-5}$ |

| (2) Heat-curable Resin Preparation, Curing Shrinkage Ratio | |
|---|---|
| Unsaturated polyester resin | |
| Unsaturated polyester | 100 parts by weight |
| Methyl ethyl ketone peroxide (10.0–10.5% active oxygen) | 0.5–1.5 parts by weight |
| Cobalt naphthenate (cobalt mass conversion 6%) | 0.5 parts by weight |
| Ester type reaction promoter | 0.2–0.4 parts by weight |
| Volume shrinkage ratio 7% | |
| Urethane Resin | |
| Polyether | 100 parts by weight |
| Isocyanate | 10–50 parts by weight |
| Volume shrinkage ratio 6.0% | |
| Epoxy Resin | |
| Epoxy resin | 100 parts by weight |
| Amine type curing agent | 30 parts by weight |
| Volume shrinkage ratio 4.5% | |

In table 1, the state of occurrence of concavities in the surfaces of molded products is shown when the molding was conducted while altering the combination of the central core members and heat-curable resins and the mold temperatures. In Table 1, when the depth of the surface concavities were measured as a percentage of the thickness of the resin layer, 0 indicates 0.05%, while Δ indicates 0.5–2%, and X indicates greater than 2%.

TABLE 1

| Central Core Member | Heat-curable Resin | Mold Temperature Attained (° C.) | | | | |
|---|---|---|---|---|---|---|
| | | 60 | 80 | 100 | 120 | 140 |
| Epoxy resin | Unsaturated polyester | X | Δ | 0 | 0 | 0 |
| Epoxy resin | Urethane | Δ | Δ | 0 | 0 | 0 |
| Epoxy resin | Epoxy | Δ | 0 | 0 | 0 | 0 |
| Foaming urethane resin | Unsaturated polyester | X | X | Δ | 0 | 0 |
| Foaming urethane resin | Urethane | X | Δ | 0 | 0 | 0 |
| Foaming urethane resin | Epoxy | X | 0 | 0 | 0 | 0 |
| PPS resin | Unsaturated polyester | X | X | X | Δ | 0 |
| PPS resin | Urethane | X | X | Δ | Δ | 0 |
| PPS resin | Epoxy | X | X | Δ | 0 | 0 |
| PC resin | Unsaturated polyester | 0 | 0 | 0 | 0 | 0 |
| PC resin | Urethane | 0 | 0 | 0 | 0 | 0 |

TABLE 1-continued

| Central Core Member | Heat-curable Resin | Mold Temperature Attained (° C.) | | | | |
|---|---|---|---|---|---|---|
| | | 60 | 80 | 100 | 120 | 140 |
| PC resin | Epoxy | 0 | 0 | 0 | 0 | 0 |
| ABS resin | Unsaturated polyester | 0 | 0 | 0 | — | — |
| ABS resin | Urethane | 0 | 0 | 0 | — | — |
| ABS resin | Epoxy | 0 | 0 | 0 | — | — |

As is clear from the results shown in Table 1, when a central core member comprising a material having a small thermal expansion ratio was combined with a heat-curable resin having a large curing shrinkage ratio, it was necessary to set the final temperature by the mold to a sufficiently high level, while when a central core member was employed comprising a material having a large thermal expansion ratio, there was not such a relationship with the curing shrinkage ratio of the heat-curable resin, and concavities were not generated even when the final temperature by the mold was low.

In this molding method for heat-curable resins, by means of a heat-induced expansion of the volume of the central core member 3 which was equal to or greater than the amount of shrinkage in volume induced by curing generated during the molding of the heat-curable resin, compensation was performed constantly over the period of time from the initiation of curing to the completion of curing, therefore concavities were not generated in the surface of the heat-curable resin molded products, and molded products were produced which had good finished surfaces.

Hereinbelow, concrete examples will be given; however, the present invention is not limited to the concrete examples described. In particular, the linear expansion coefficient of the resin selected for the central core member varied depending on the preparation, so that the preparation and the heating temperature of the mold should be determined in accordance with this.

EXAMPLE 1

Using the central core member, heat-curable resin (preparation), and mold heating conditions shown in Table 2, molding was conducted, and a good molded product was obtained which had no concavities. The temperature attained by the mold was set to 100° C. so that the amount of shrinkage of the unsaturated polyester resin and the amount of expansion of the epoxy resin central core member were identical. Furthermore, the rate of increase in the temperature in the mold and the preparation of the unsaturated polyester resin (the curing rate) were determined so that the expansion of the central core member and the shrinkage of the resin were synchronized.

TABLE 2

| Central core member | Epoxy resin | |
|---|---|---|
| Heat-curable resin | Unsaturated polyester | 100 parts |
| | Methyl ethyl ketone peroxide | 1.5 parts |
| | Cobalt naphthenate | 0.5 parts |
| | Ester type reaction promoter | 0.4 parts |
| Mold conditions | Attained 100° C., initially 25° C., Increase by 20° C./minute | |
| Heating time | 12 minutes | |

EXAMPLE 2

Molding was conducted using central core member, the heat-curable resin (preparation) and the mold heating conditions shown in Table 3, and a good molded product with no concavities was obtained. Because the expansion ratio of the foaming urethane resin was small, the final temperature by the mold was set to 120° C., so that the amount of shrinkage and the amount of expansion were identical. Furthermore, the rate of increase in the temperature of the mold and the preparation of the unsaturated polyester resin (the curing rate) were determined so that the expansion of the central core member and the shrinkage of the resin were synchronized.

TABLE 3

| Central core member | Foaming urethane resin | |
|---|---|---|
| Heat-curable resin | Unsaturated polyester | 100 parts |
| | Methyl ethyl ketone peroxide | 1.5 parts |
| | Cobalt naphthenate | 0.5 parts |
| | Ester type reaction promoter | 0.4 parts |
| Mold conditions | Attained 120° C., initially 25° C., increase by 20° C./minute | |
| Heating time | 14 minutes | |

EXAMPLE 3

Molding was conducted using the central core member, heat-curable resin (preparation), and mold heating conditions shown in Table 4, and a good molded product with no concavities was obtained. The thermal expansion ratio of the polycarbonate resin was large, and the amount of shrinkage in the epoxy resin was small, so that an attained mold temperature of 60° C. was sufficient. Furthermore, the rate of temperature increase and the epoxy resin preparation (curing rate) were determined so that the expansion of the central core member and the shrinkage of the resin were synchronized.

TABLE 4

| Central core member | Polycarbonate resin | |
|---|---|---|
| Heat-curable resin | Epoxy | 100 parts |
| | Amine | 30 parts |
| Mold conditions | Attained 60° C., initially 25° C., increase by 8° C./minute | |
| Heating time | 12 minutes | |

COMPARATIVE EXAMPLE 1

Molding was conducted using the central core member, heat-curable resin (preparation), and mold heating conditions shown in Table 5, and concavities were generated in the molded product. The attained temperature of the mold was low, at 40° C., and the expansion of the epoxy resin of the central core member was small, so that it was not possible to compensate for the shrinkage of the unsaturated polyester resin.

TABLE 5

| Central core member | Epoxy resin | |
|---|---|---|
| Heat-curable resin | Unsaturated polyester | 100 parts |
| | Methyl ethyl ketone peroxide | 1.5 parts |
| | Cobalt naphthenate | 0.5 parts |
| | Ester type reaction promoter | 0.4 parts |
| Mold conditions | Attained 40° C., initially 25° C., increase by 20° C./minute | |
| Heating time | 30 minutes | |

COMPARATIVE EXAMPLE 2

Molding was conducted using the central core member, heat-curable resin (preparation), and mold heating conditions shown in Table 6 and concavities were generated in the molded product. The rate of increase in the temperature of the mold was low, so that the expansion of the central core member was delayed. On the contrary, a large amount of the methyl ethyl ketone peroxide curing agent was mixed with the unsaturated polyester resin, so that the curing rate was high. For this reason, the curing shrinkage of the resin was not synchronized with the expansion of the central core member, and thus the expansion of the central core member was delayed.

TABLE 6

| Central core member | Epoxy resin | |
|---|---|---|
| Heat-curable resin | Unsaturated polyester | 100 parts |
| | Methyl ethyl ketone peroxide | 3.0 parts |
| | Cobalt naphthenate | 0.5 parts |
| | Ester type reaction promoter | 0.4 parts |
| Mold conditions | Attained 80° C., initially 25° C., Increase by 2° C./minute | |
| Heating time | 40 minutes | |

What is claimed is:

1. A method of manufacturing a heat-curable resin molded product, comprising:

disposing a central core member in a mold, said central core member being made of a resin which has a linear expansion coefficient of $7\times10^{-5}/°$ C. or greater;

injecting heat-curable resin around said central core member in said mold; and heating said mold to a maximum temperature of at least 60° C. to cure said heat-curable resin.

2. A method of manufacturing heat-curable resin molded products according to claim 1, wherein said central core member is made of a polycarbonate resin or ABS resin and said heat-curable resin is selected from the group consisting of unsaturated polyester resin, urethane resin and epoxy resin.

3. A method of manufacturing a heat-curable molded resin product according to claim 1, wherein said mold is heated to a maximum temperature of between 60 and 120° C.

4. A method of manufacturing a heat-curable molded resin product according to claim 1, wherein said mold is heated to a maximum temperature of between 60 to 80° C.

* * * * *